United States Patent
Dunne et al.

(10) Patent No.: US 9,984,044 B2
(45) Date of Patent: May 29, 2018

(54) PREDICTING PERFORMANCE REGRESSION OF A COMPUTER SYSTEM WITH A COMPLEX QUEUING NETWORK MODEL

(71) Applicant: International Business Machines Corporation, Armonk, NY (US)

(72) Inventors: Jonathan Dunne, Dungarvan (IE); James P. Galvin, Jr., Georgetown, KY (US); Shadi Ghaith, Dublin (IE); Patrick J. O'Sullivan, Dublin (IE); Hitham Ahmed Assem Aly Salama, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 14/542,640

(22) Filed: Nov. 16, 2014

(65) Prior Publication Data

US 2016/0140262 A1 May 19, 2016

(51) Int. Cl.
*G06F 17/18* (2006.01)
*G06F 9/50* (2006.01)
(Continued)

(52) U.S. Cl.
CPC .............. *G06F 17/18* (2013.01); *G06F 9/505* (2013.01); *G06F 11/008* (2013.01); *G06F 11/26* (2013.01);
(Continued)

(58) Field of Classification Search
CPC .................................. G06F 17/18; G06F 9/505
See application file for complete search history.

(56) References Cited

U.S. PATENT DOCUMENTS 7,296,256 B2 11/2007 Liu et al.
7,739,099 B2 6/2010 Liu et al.
(Continued)

FOREIGN PATENT DOCUMENTS

CN 100391159 C 5/2008
CN 101707632 A 5/2010
(Continued)

OTHER PUBLICATIONS

Baynat, B. et al. "A product-form approximation method for general closed queuing networks with several classes of customers" in: Performance Evaluation, vol. 24, Issue 3, 1996, p. 165-188, [Retrieved on Mar. 23, 2017]. Retrieved from the Internet: <URL: http://www.sciencedirect.com/science/article/pii/016653169400028X><doi: 10.1016/0166-5316(94)00028>.*

(Continued)

*Primary Examiner* — Omar F Fernandez Rivas
*Assistant Examiner* — Robert S Brock
(74) *Attorney, Agent, or Firm* — VanLeeuwen & VanLeeuwen; Anthony V. S. England

(57) ABSTRACT

An approach is provided for predicting system performance. The approach predicts system performance by identifying a Queuing Network Model (QNM) corresponding to a clustered system that handles a plurality of service demands using a plurality of parallel server nodes that process a workload for a quantity of users. A workload description is received that includes server demand data. Performance of the clustered system is predicted by transforming the QNM to a linear model by serializing the parallel services as sequential services, identifying transaction groups corresponding to each of the server nodes, and distributing the workload among the transaction groups across the plurality of nodes. The approach further solves analytically the linear (Continued)

model with the result being a predicted resource utilization (RU) and a predicted response time (RT).

20 Claims, 8 Drawing Sheets

(51) Int. Cl.
| | |
|---|---|
| *H04L 29/08* | (2006.01) |
| *H04L 12/26* | (2006.01) |
| *H04L 12/24* | (2006.01) |
| *G06F 11/36* | (2006.01) |
| *G06F 11/26* | (2006.01) |
| *G06F 11/00* | (2006.01) |

(52) U.S. Cl.
CPC ........ *G06F 11/3672* (2013.01); *H04L 41/147* (2013.01); *H04L 43/50* (2013.01); *H04L 67/10* (2013.01)

(56) References Cited

U.S. PATENT DOCUMENTS

| | | | |
|---|---|---|---|
| 8,090,671 | B2 | 1/2012 | Tantawi |
| 8,346,909 | B2 | 1/2013 | Dan et al. |
| 8,756,307 | B1* | 6/2014 | Chen .................. G06F 11/3414 709/223 |
| 8,805,647 | B2 | 8/2014 | Smirnov et al. |
| 9,003,416 | B2 | 4/2015 | Gangemi et al. |
| 9,111,022 | B2 | 8/2015 | Kraft et al. |
| 2005/0125213 | A1 | 6/2005 | Chen et al. |
| 2005/0240935 | A1* | 10/2005 | Ramanathan ....... G06F 11/3447 718/105 |
| 2011/0093253 | A1 | 4/2011 | Kraft et al. |
| 2012/0290263 | A1 | 11/2012 | Smirnov et al. |
| 2013/0339974 | A1 | 12/2013 | Mitchell et al. |
| 2014/0350889 | A1 | 11/2014 | Smirnov et al. |
| 2015/0067140 | A1 | 3/2015 | Branch et al. |

FOREIGN PATENT DOCUMENTS

| | | |
|---|---|---|
| CN | 101996126 A | 3/2011 |
| CN | 101916321 B | 2/2013 |
| CN | 102158357 B | 6/2013 |
| EP | 2312445 A1 | 4/2011 |
| WO | 0125876 A2 | 4/2001 |
| WO | 2012021328 A2 | 2/2012 |
| WO | 2013153029 A1 | 10/2013 |

OTHER PUBLICATIONS

Mansharamani, R. et al., "Performance Testing: Far from Steady State," 2010 IEEE 34th Annual Computer Software and Applications Conference Workshops, Seoul, 2010, pp. 341-346. [Retrieved on Mar. 23, 2017] Retrieved from the Internet: <URL: http://ieeexplore.ieee.org/stamp/stamp.jsp?tp=&arnumber=5614034&isnumber=5614033><doi: 10.1109/COMPSACW.2010.66>.*
Urgaonkar et al., "An Analytical Model for Multi-tier Internet Services and Its Applications", 2005 ACM International Conference on Measurement and Modeling of Computer Systems, SIGMETRICS'05, Jun. 2005, Banff, Alberta, Canada, 12 pages.
Menasce, "Two-level iterative queuing modeling of software contention," 10th IEEE International Symposium on Modeling, Analysis and Simulation of Computer and Telecommunications Systems, Oct. 2002, Fort Worth, TX, pp. 267-276.
Kounev et al., "Performance modeling and evaluation of large-scale j2ee applications," 29th International Computer Measurement Group Conference, Dallas, TX, Dec. 2003, pp. 273-283.
Grinshpan, "Solving Enterprise Applications Performance Puzzles," John Wiley and Sons, Inc., Hoboken, New Jersey, 2012, 250 pages.
Bertoli et al., "Java modelling tools: an open source suite for queueing network modelling and workload analysis," 3rd International Conference on the Quantitative Evaluation of SysTems (QEST) 2006, Riverside, CA, IEEE Press, Sep. 2006, 2 pages.
Smith et al., "Software Performance Engineering," Addison-Wesley, 1990, 23 pages.
Baskett et al., "Open, closed, and mixed networks of queues with different classes of customers," Journal of the Association for Computing Machinery, vol. 22, No. 2, Apr. 1975, pp. 248-260.
Ghaith et al., "Automatic, load-independent detection of performance regressions by transaction profiles," 2013 International Workshop on Joining AcadeMiA and Industry Contributions to testing Automation, Jamaica 2013, Lugano, Switzerland, May 2013, pp. 59-64.
Liu et al., "Modeling 3-tiered web applications," 13th IEEE International Symposium on Modeling, Analysis, and Simulation of Computer and Telecommunication Systems, Atlanta, GA, Sep. 2005, pp. 307-310.
Rolia et al., "The method of layers," IEEE Transaction on Software Engineering, vol. 21, Issue 8, pp. 689-700, Aug. 1995.
Dunne et al., "Predicting Performance by Analytically Solving a Queuing Network Model," U.S. Appl. No. 14/542,639, filed Nov. 16, 2014, 36 pages.

* cited by examiner

PREDICTING PERFORMANCE REGRESSION OF A COMPUTER SYSTEM WITH A COMPLEX QUEUING NETWORK MODEL

BACKGROUND OF THE INVENTION

Complex IT environments contain numerous products and applications that work in a delicate harmony. Administration and configuration of these systems needs to be managed on these products as well as between numerous products. Using modeling to predict applications performance under various possible hardware and software configurations is used in Capacity Management (CM) processes. Modeling saves time and provides a reduction of the cost required to buy and setup the recommended hardware alternatives, and the test the recommended alternatives by running a test load on them. Modeling, however, faces particular challenges. Analytical approaches to QNMs are relatively fast, but unfortunately are limited to simple QNMs that likely do not adequately represent the complex IT environment. Unfortunately, the complexity of multiple interacting processes running on multiple hardware resources in a complex IT environment makes performance prediction and capacity planning difficult. Complex IT environments that comprise distributed systems are inherently difficult to analyze, and this difficulty becomes even more challenging when the environment includes "black-box" components such as software from different vendors, usually with no source code or instrumentation available. Traditional QNMs generated by most existing tools are complex and the model complexity grows with system complexity.

SUMMARY

An approach is provided for predicting system performance. The approach predicts system performance by identifying a Queuing Network Model (QNM) corresponding to a clustered system that handles a plurality of service demands using a plurality of parallel server nodes that process a workload for a quantity of users. A workload description is received that includes server demand data. Performance of the clustered system is predicted by transforming the QNM to a linear model by serializing the parallel services as sequential services, identifying transaction groups corresponding to each of the server nodes, and distributing the workload among the transaction groups across the plurality of nodes. The approach further solves analytically the linear model with the result being a predicted resource utilization (RU) and a predicted response time (RT).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
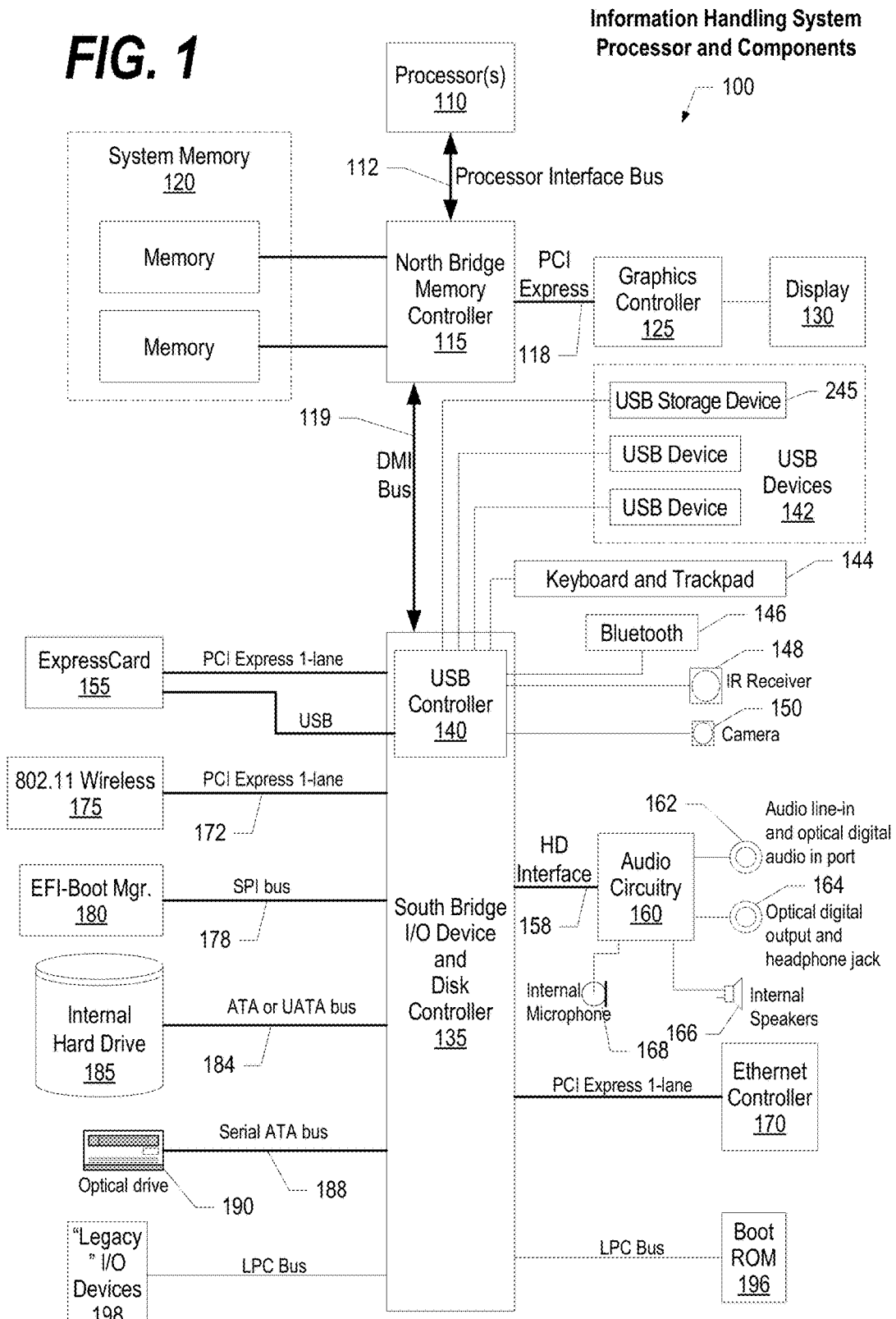
FIG. 1 depicts a block diagram of a processor and components of an information handling system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
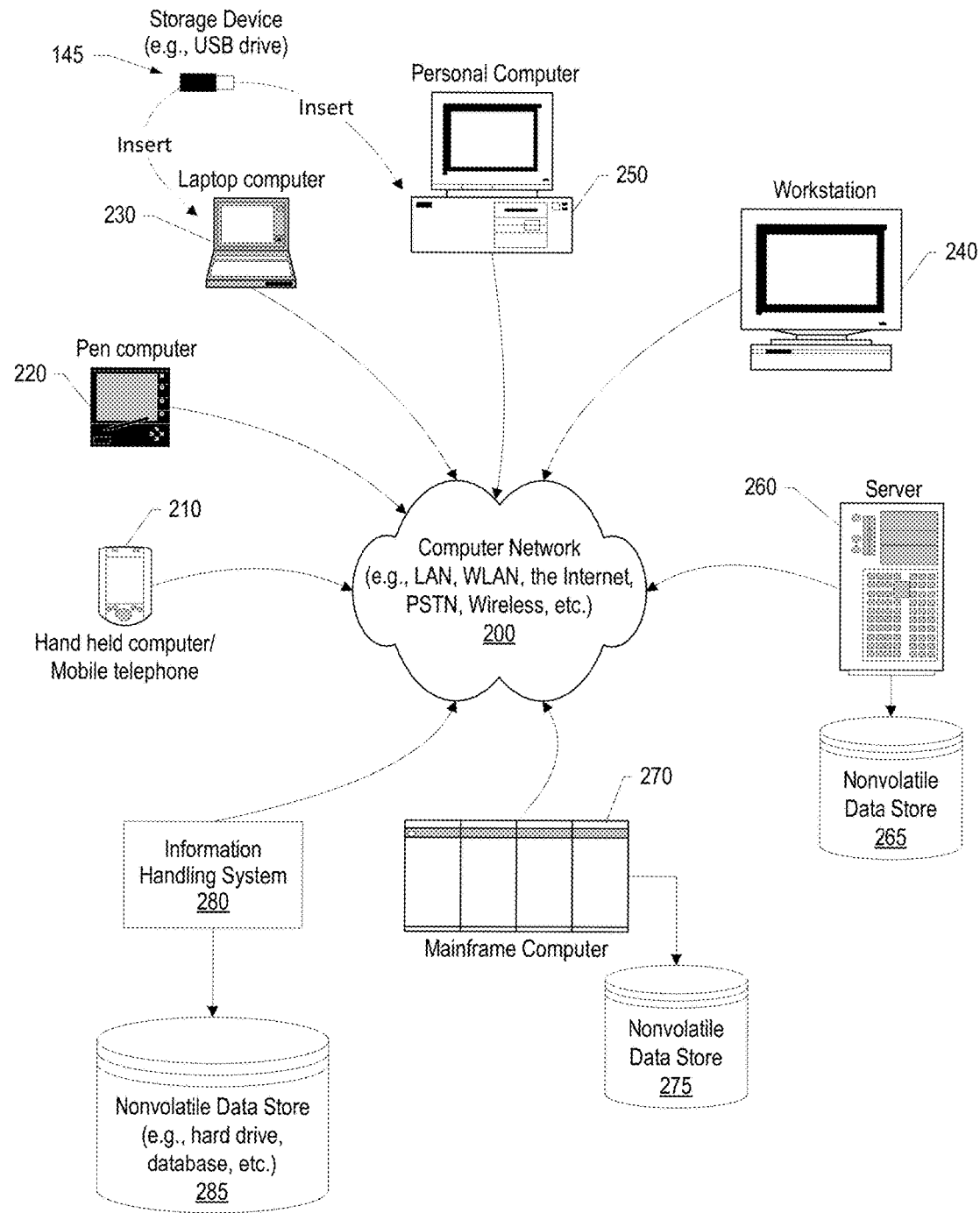
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8B show an approach for predicting performance by analytically solving a Queuing Network Model (QNM) for a complex Information Technology (IT) environment. In this approach, modeling techniques are extended to general three-tier systems. At the same time, the approach reduces the measurement difficulties encountered when measuring the QNM parameters (service demands). In doing, the approach generates a generic model for three-tier systems that accounts for contention caused by software resources. In particular, the number of threads of the Application Server (AS) and the number of database Data Sources (DS) are presented in this approach. The model generated by this approach is simple enough to be solved using time efficient analytical solvers and the model is further extendable to handle contention caused by memory management and critical sections. In this manner, the approach presented herein improves computer systems by more accurately predicting a system's performance and reducing the time and resources needed to predict the performance.

The approach improves the Capacity Management (CM) process by enhancing its accuracy and significantly reducing the time required to solve the resulting model. The approach therefore improves the functionality of computer systems in an IT environment by utilizing a simple model applicable for a wide range of applications (three-tier) that can be solved relatively quickly by QNM analytical solvers, and measures the system service demands with single user tests available in many load generation tools. The approach produces more accurate results as compared to normal load testing results, leading to more accurate sizing of IT environments. The approach further provides separate hardware and software components that allow for separate flexible sizing of the system and, despite providing flexible sizing, the approach is not application specific and does not need code level knowledge or instrumentation. In addition, the approach is suitable for extending to other software resources, such as memory and critical sections.

The approach further provides for predicting the performance regression of a computer system with a complex Queuing Network Model (QNM) containing clusters of servers. While traditional approaches can simulate complex computer systems with complex QNMs for predicting the performance counters including the Transaction Response Time (TRT) and Resource Utilization (RU) for different workloads, these traditional approaches use simulation and are time consuming processes that can take several hours for complex systems. The approach provided herein solves challenges posed by complex QNMs in clustered environments by using a technique that predicts the performance issues by simplifying the complex QNMs that contain clusters of servers and, consequently, solving the simplified QNM analytically, while at the same time achieving comparable results to traditional (more time consuming) approaches. This approach solves the problem of predicting performance anomalies under different workloads by using a model that is solved analytically. This approach is based on solving the complex QNMs for computer systems (analytically) in order to predict performance regression anomalies. The approach utilizes a fast technique to predict the performance characteristics of complex systems. The approach provides simplification for QNMs for predicting performance anomalies. The approach is based on modifying the parallel servers to appear as sequential servers while, at the same time, the approach modifies the service demands by introducing new transaction groups—one for each extra node in the cluster, and the approach divides the load among all of the transaction groups. The approach improves the functionality of a cluster of computer systems by better predicting the performance of the cluster to allocate appropriate system resources to the cluster. The approach further improves the functionality of a computer system by avoiding computer-resource intensive simulation that would otherwise be needed to predict the clustered environment performance with such avoidance making such computer resources available to other processes.

Figure 3:
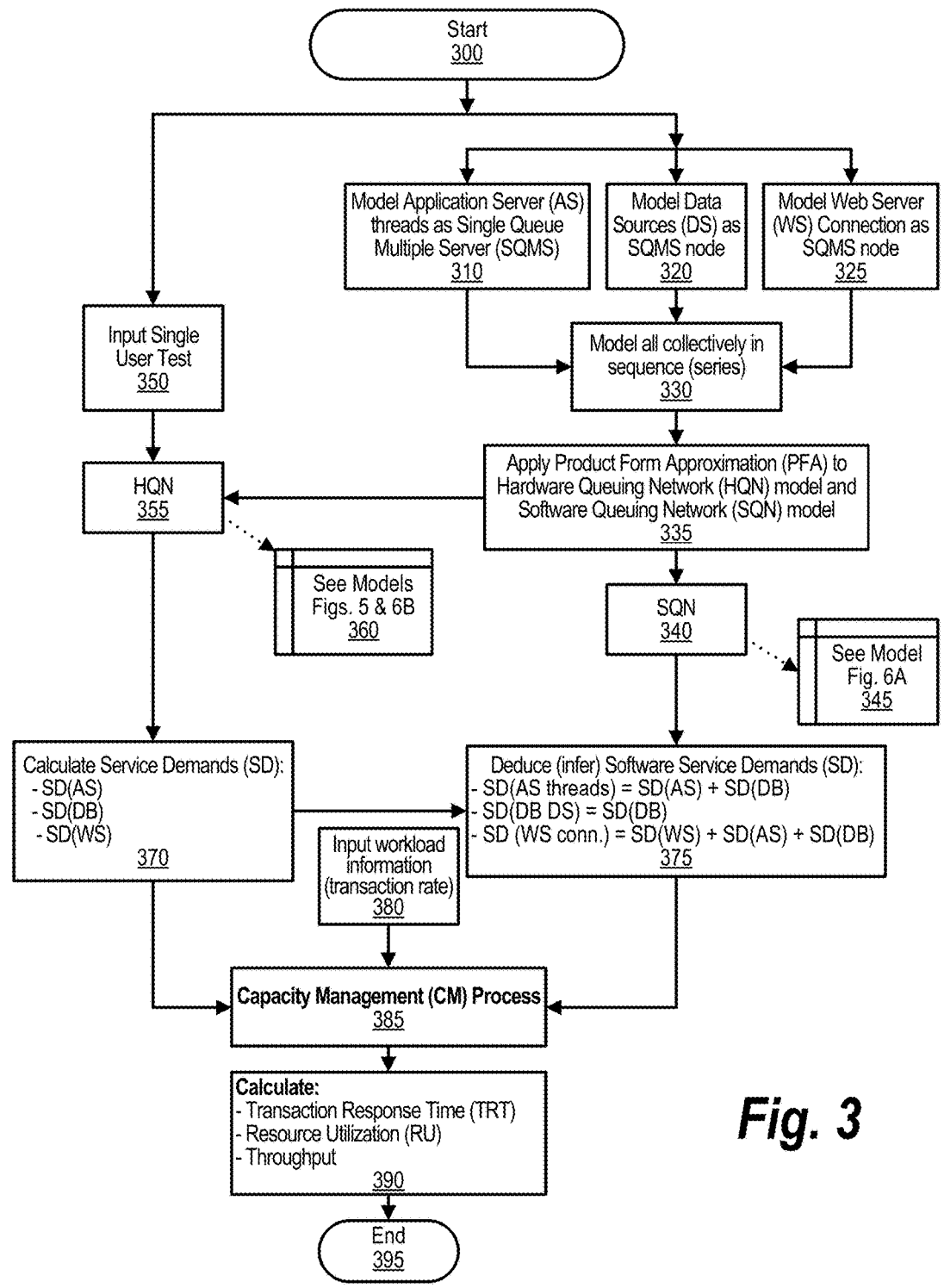
FIG. 3 is a flowchart that depicts the steps and processes used to predicting performance of a complex IT environment by analytically solving a Queuing Network Model (QNM)
Figure 4:
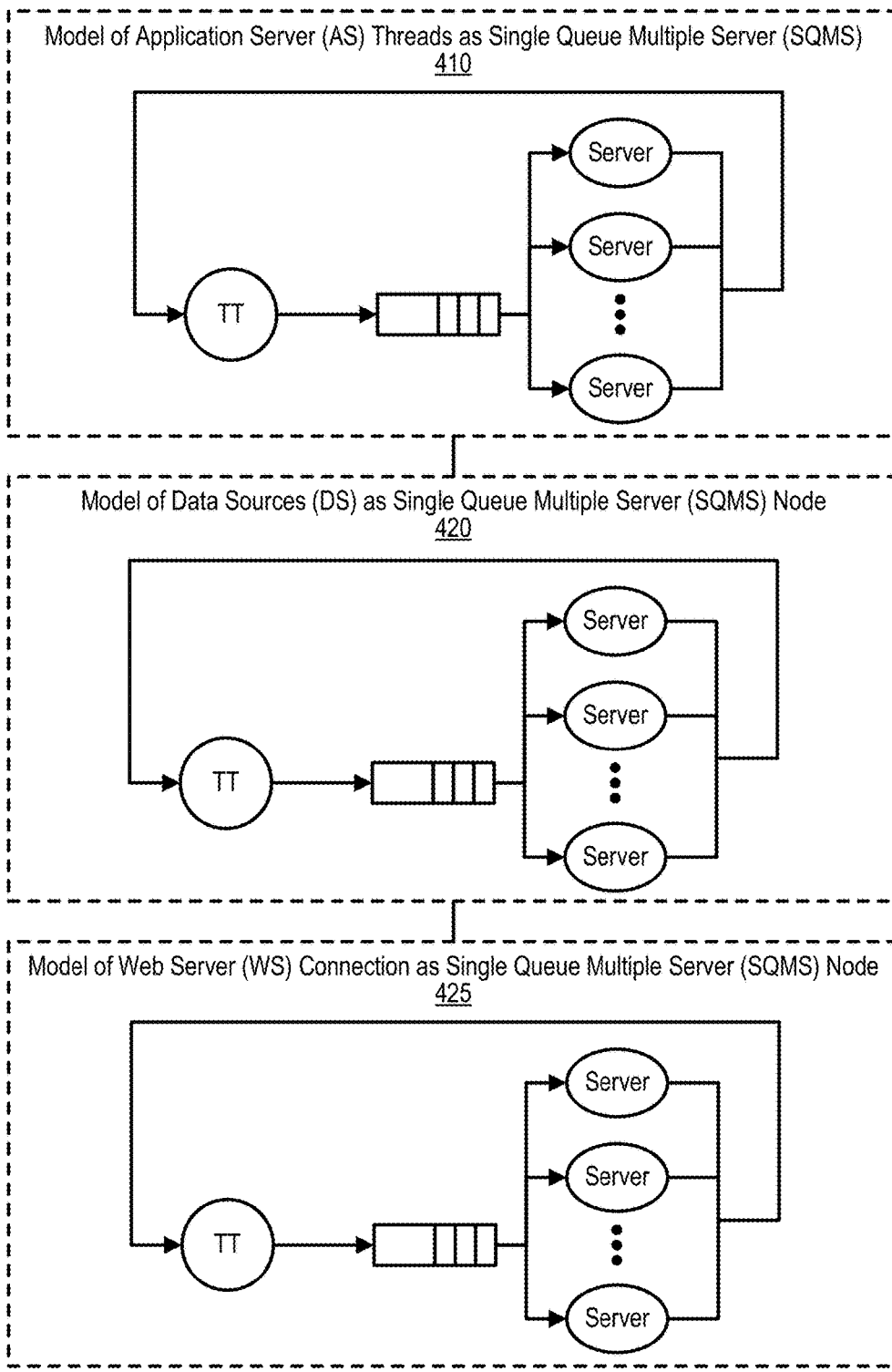
FIG. 4 is a component diagram depicting the models of the Application Server threads, Data Sources, and Web Server connection of a complex IT environment.
Figure 6A:
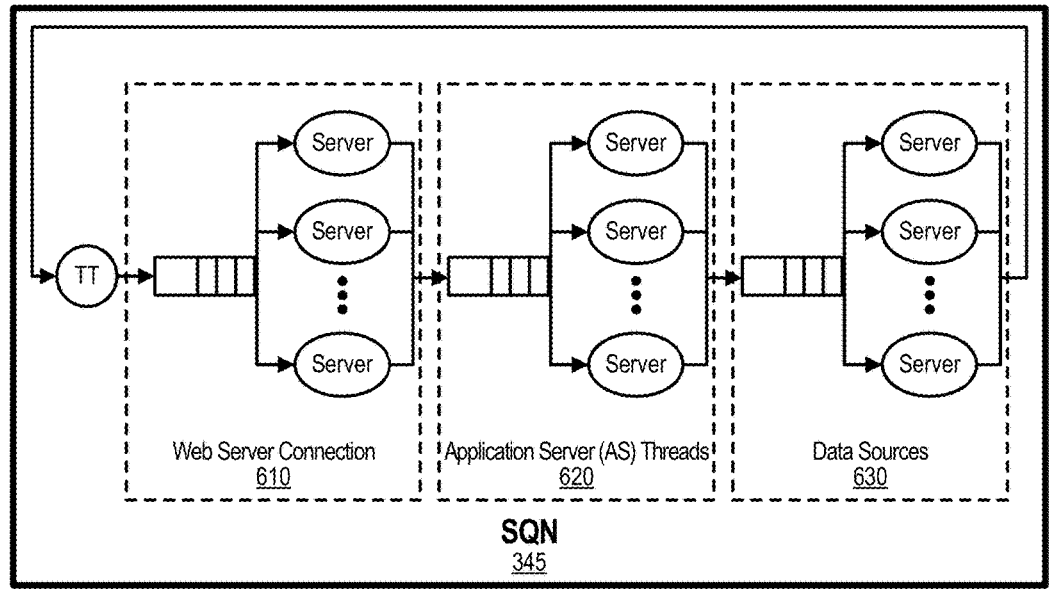
FIG. 6A is a depiction of a Software Queuing Network (SQN) model formed by combining the three models shown in FIG. 4.

FIG. 3 is a flowchart that depicts the steps and processes used to predicting performance of a complex IT environment by analytically solving a Queuing Network Model (QNM). FIG. 3 processing commences at 300 and shows the steps taken by a process that performs a routine to predict system performance. At step 310, the process models Application Server (AS) threads as Single Queue Multiple Server (SQMS). At step 320, the process models Data Sources (DS) as SQMS node. At step 325, the process models Web Server (WS) Connection as SQMS node. At step 330, the process models all collectively in sequence (series). FIG. 4 shows examples of the models corresponding to the various hardware modules. FIG. 4 depicts the QNM for the application server threads (model 410), the QNM for the database data sources (model 420), and the QNM for the web server connection (model 425). FIG. 6A depicts the software QNMs modeled collectively in sequence.

At step 335, the process applies Product Form Approximation (PFA) to Hardware Queuing Network (HQN) model and Software Queuing Network (SQN) model. The result of step 335 is SQN 340 which is stored in memory area 345 and HQN 355 which is stored in memory area 360. See FIG. 6A for a depiction of the SQN and FIGS. 3 and 6B for depictions of the HQN.

At step 350, the process receives input from a single user test that is used to test the hardware service demands. At step 370, the process calculates the Hardware Service Demands (SD). The Hardware Service Demands include the service demands on the application server (SD(AS)), the service demands on the database server (SD(DB)), and the service demands on the web server (SD(WS)). At step 375, the process deduces, or infers, the Software Service Demands (SD) based upon various hardware service demands that were calculated in step 370. The software service demand of executing the application server threads (SD(AS threads)) is approximated as being the sum of the hardware service demands found at the application server (SD(AS)) and the hardware service demands found at the database server (SD(DB)). The software service demand of providing the database data sources (SD(DB DS)) is approximated as being equivalent to the hardware service demands found at the database server (SD(DB)). Finally, the software service demand of executing a web server connection (SD(WS Conn)) is approximated as the sum of the hardware service demands found at the web server (SD(WS)), the hardware service demands found at the application server (SD(AS)) and the hardware service demands found at the database server (SD(DB)).

At step 380, the process inputs workload information (transaction rate) pertaining to the system that is being tested. At step 385, a Capacity Management (CM) Process is performed using the hardware service demands calculated in step 370, the software service demands calculated in step 375, and the transaction rate received at step 380. Based on the various inputs, at step 390, the CM process calculates a Transaction Response Time (TRT) for the system, a Resource Utilization (RU) for the system, and a Throughput. FIG. 3 processing thereafter ends at 395.

Figure 5:
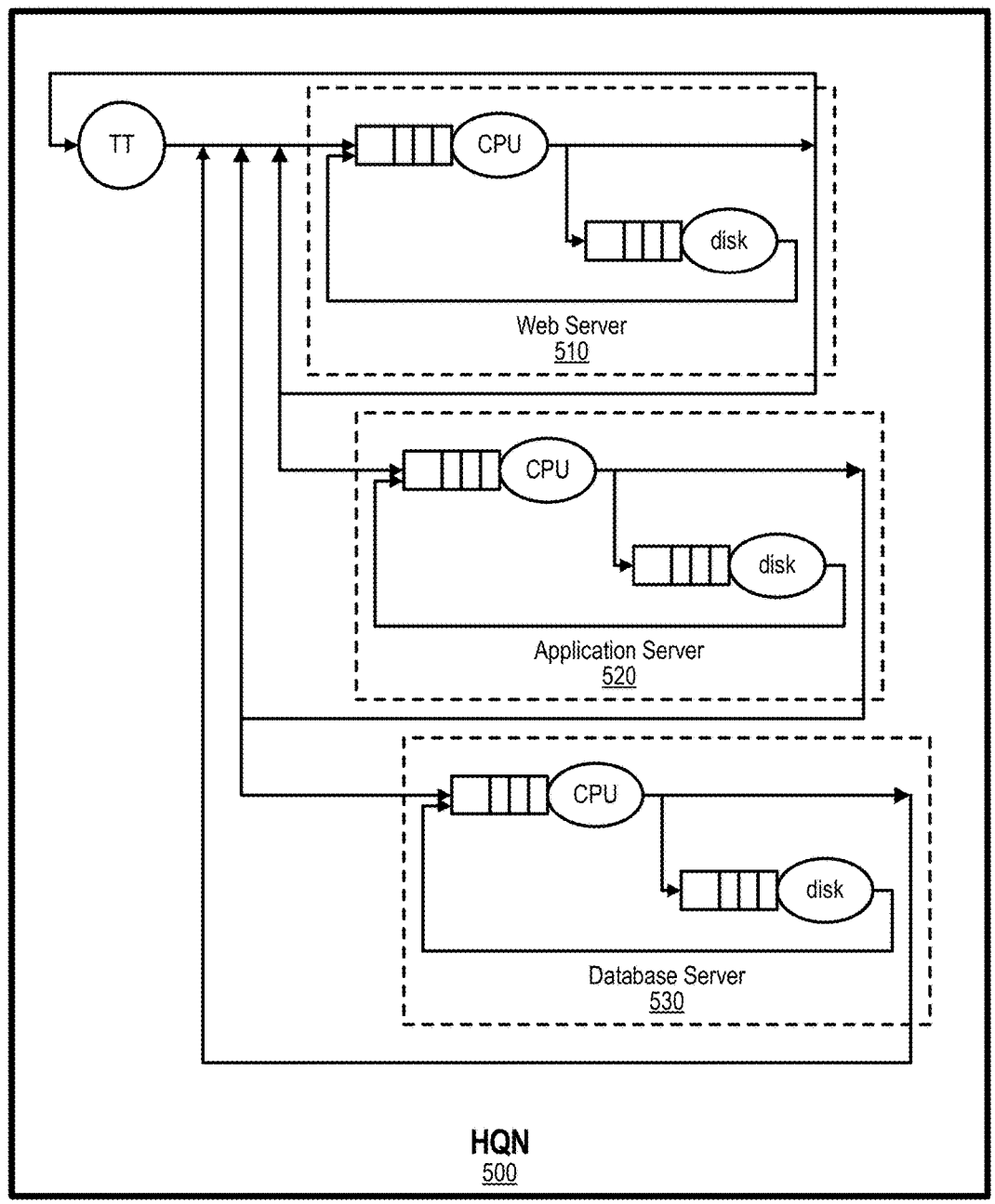
FIG. 5 is a depiction of a Hardware Queuing Network (HQN) model of the complex IT environment.

FIG. 4 is a component diagram depicting the models of the Application Server threads, Data Sources and Web Server connection of a complex IT environment and FIG. 5 is a depiction of a Hardware Queuing Network (HQN) model of the complex IT environment. The Hardware Queuing Network (HQN) is a typical QNM such as the one shown in FIG. 5, where normal hardware resources such as CPU and hard disk are modeled as load independent queuing stations in addition to the user Think Time (TT) node which is modeled by a delay station. In FIG. 5, HQN 500 is depicted with interaction between various hardware components in the complex IT environment. These hardware components include web server 510, application server 520, and database server 530.

Returning to FIG. 4, each software component (Application Server threads, Data Sources. and Web Server connection) is simplified and modeled as a Single Queue Multiple Server (SQMS) environment. Model 410 depicts the Application Server threads, model 420 depicts the database Data Sources, and model 425 depicts the Web Server connection. The Software Queuing Network (SQN) contains, in addition to the TT station, a set of nodes each represents a certain software module. Each software module either causes no queuing to execute in which case it is represented by a delay station, or it can cause queuing to execute (such as a critical section) in which case it is represented as a load independent station (i.e. with a queue). For example, the critical section is represented by a station that has one processing unit and a queue. A simple SQN is shown for each of the software components in FIG. 4. Each software module in the SQN has a service demand on each hardware node in the HQN that is shown in FIG. 5.

Referring to both FIGS. 4 and 5, the total service demand on each module in the SQN is the summation of all service demands for that module on each station in the HQN. While, the total service demands for each hardware station in the HQN is the summation of all service demands for that station caused by each software module in the SQN. The SQN is first solved with the initial (single user) modules total service demands using the total number of users accessing the system. Then the number of blocked users is calculated by finding out the number of users in each station queue within the SQN. The HQN is then solved with the total number of users excluding the users in the queues of the SQN and the total service demands of the hardware stations. After solving the HQN each module service demand (in the SQN) is set to the sum of the fraction of the residence time (queuing and serving time) of each station in the HQN proportional to this module contribution to the original total service demands of each HQN station. Then the above is repeated again by solving the SQN with the new service demands and solving the HQN with the total number of users excluding the blocked users. This continues until the number of blocked users is reasonably stable.

The application server (AS) in FIG. 5 dispatches each new job to a new thread which executes the required server module. During its execution the thread accesses the hardware resources (CPU and hard disk) on both the AS and the Database Server (DBS). Most of the AS code is executed within the thread, except the ignorable demands dispatching module, so the SQN of the AS (520) is depicted with a single module. This module can be represented by a single-queue multi-server station, with a number of servers equals to the number of the available threads in the AS. FIGS. 4 and 5 shows both the HQN and the SQN in this case. Consequently, the service demand for that single software module equals the sum of service demands over all the hardware resources both at the AS and the DBS. This simplification allows the service demands to be measured by a single user test on all system resources. The SQN in FIG. 4 can be solved analytically by modeling the single-queue multi-server station in the SQN as a load-dependent station. Solving the HQN shown in FIG. 5 with the non-blocked users is solved using a analytical technique.

The HQN in FIG. 5 shows that the AS makes multiple calls to the DBS. The DBS returns the execution to the AS after each call and finally the AS returns back to the user (TT station). Given that the number of data sources (DS) on the DBS is limited (same as AS threads), the software contention (SC) effect happens at both tiers of the system resulting of a complex nested SQN. To address this, the approach uses an approximation which approximates the QNM of the system (the HQN) to assume that each station is visited only once. This makes the HQN less complex as the AS will make one call to the DBS which will serve the job and return back to the TT station.

Figure 6B:
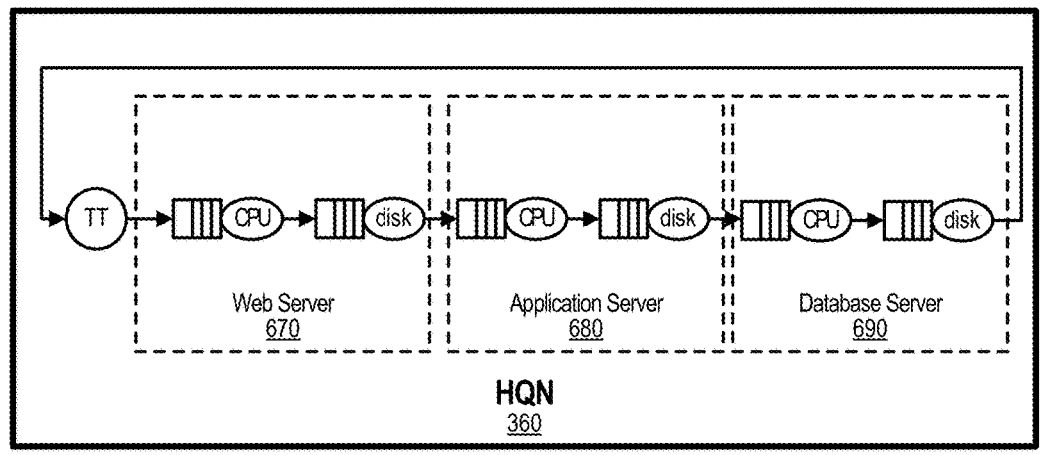
FIG. 6B is a depiction of a refined Hardware Queuing Network (HQN) formed by serializing the HQN shown in FIG. 5.

FIG. 6A is a depiction of a Software Queuing Network (SQN) model formed by combining the three models shown in FIG. 4 and FIG. 6B is a depiction of a refined Hardware Queuing Network (HQN) formed by serializing the HQN shown in FIG. 5. In the same manner as explained for the HQN, and by applying the same theoretical background, the same approximation is applied at the SQN level shown in FIG. 4. The approach assumes the job visits each software module (the web server connection, the AS threads, and the DBS DS) only once. This assumption allows the modules to be depicted sequentially with each module feeding into the next module as shown in FIG. 6A. Here, the job visits web server connection 610, then AS threads 620, and finally DBS DS 630. The SQN contains three single-queue multi-server stations with each of the stations is visited once as shown in FIG. 6A.

Each software module in FIG. 6A only relies on the hardware service demands depicted in FIG. 6B within the same tier. In other words, web server connection 610 shown in FIG. 6A relies on the CPU and hard disk hardware service demands of web server 670, application server 680, and database server 690 shown in FIG. 6B. Application server 620 shown in FIG. 6A relies on the CPU and hard disk hardware service demands of application server 680 and database server 690 shown in FIG. 6B. Finally, database data sources 630 shown in FIG. 6A relies on the CPU and hard disk hardware service demands of database server 690 shown in FIG. 6B.

The blocked users are calculated to include users waiting in the queues of both single-queue multi-server stations representing the threads and DS modules. The SQN shown in FIG. 6A and the HQN shown in FIG. 6B are iteratively solved in the same manner as explained for the single tier system. This approximation can be generalized to n-tier systems.

Figure 7:
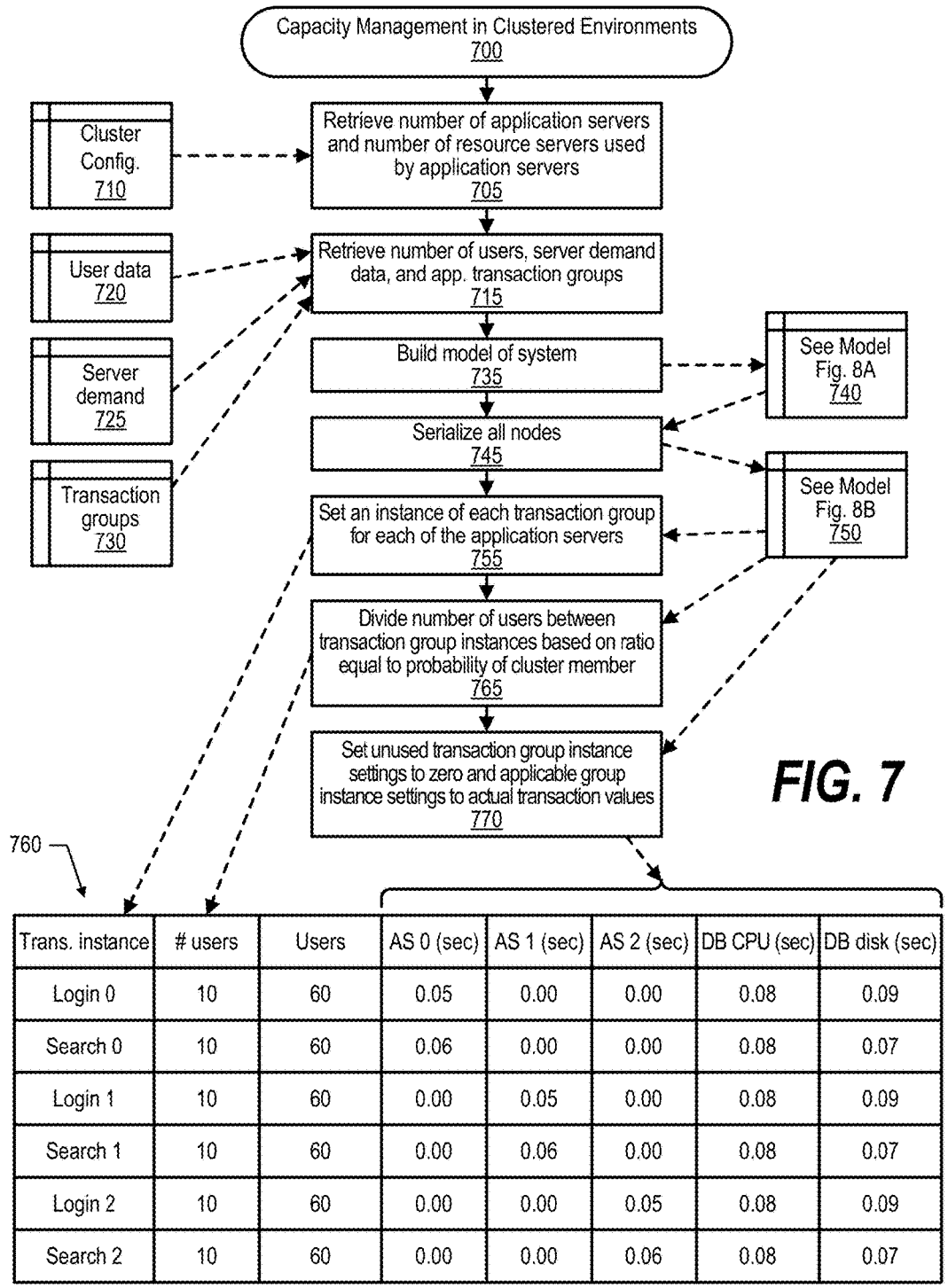
FIG. 7 is a depiction of a flowchart showing the logic performed by a process that performs capacity management in clustered environments.

FIG. 7 is a depiction of a flowchart showing the logic performed by a process that performs capacity management in clustered environments. FIG. 7 processing commences at 700 and shows the steps taken by a process that performs a capacity management routine for clustered environments. At step 705, the process retrieves number the of application servers and the number of resource servers used by the application servers from cluster configuration memory area 710. At step 715, the process retrieves the number of users, the server demand data, and the application transaction group data from user memory area 720, server demand memory area 725, and transaction groups memory area 730, respectively. At step 735, the process builds a model of the clustered system environment that is stored in memory area 740 (see FIG. 8A for a depiction of a clustered system environment model). At step 745, the process serializes all of the nodes depicted in the model stored in memory area 740 with the serialization resulting in a serialized clustered system environment model that is stored in memory area 750 (see FIG. 8B for a depiction of a serialized clustered system environment model). At step 755, the process sets an instance of each transaction group for each of the application servers in table 760. At step 765, the process divides the number of users between the transaction group instances based on a ratio that is equal to the probability of each cluster member with the table being updated to show the number of users for each transaction group instance. In the example, there are sixty users divided amongst six transaction group instances so that each instance is assigned ten users. At step 770, the process sets each unused transaction group instance settings to a value of zero and sets the applicable group instance settings to actual transaction values. These instance settings are reflected in the updates made to table 760.

Figure 8A:
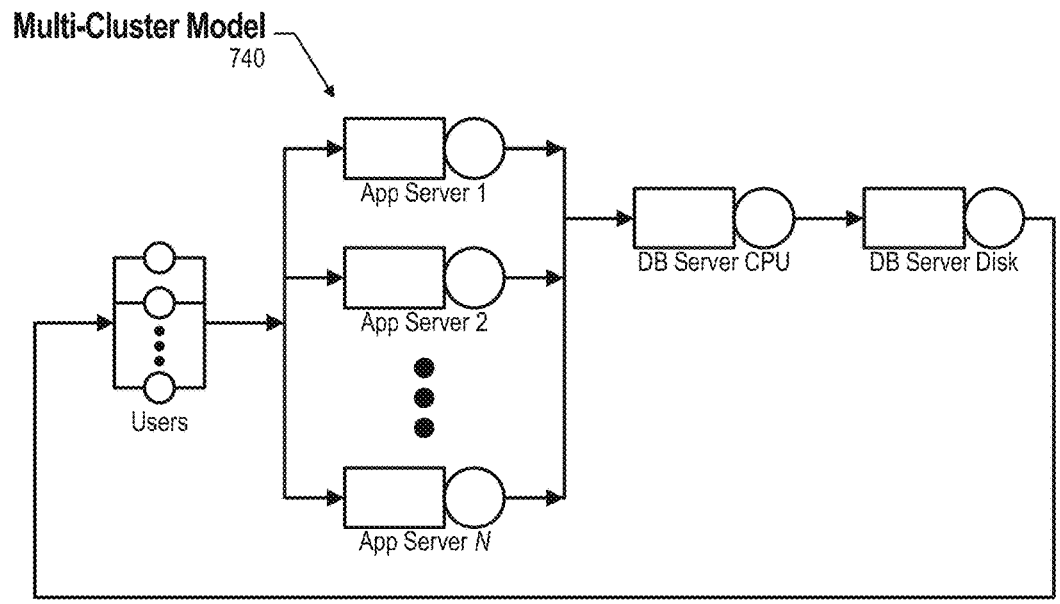
FIG. 8A is a depiction of a multi-cluster model depicting a clustered complex IT environment.

FIG. 8A is a depiction of a multi-cluster model depicting a clustered complex IT environment. Multi-cluster model 740 shows a system composed of three nodes as an example this nodes are clusters of the application server where the load is distributed between these servers via a load balancer software with a certain probability. The app server nodes (app server 1, app server 2, through app server N) are simplified in order to solve the complex clustered environment analytically and predict any performance regression anomalies. The app servers are modeled as parallel nodes. In the example, assume that the system has three application servers in the cluster and that the load is 30 users which are distributed equally among them. Also assume that the servers are identical and the service demands n such servers are 0.05 and 0.06 sec. For each of the two classes called login and search respectively. This is shown in table below:

| Trans. | # users | Users (sec) | App Serv 0 (sec) | App Serv 1 (sec) | App Serv 2 (sec) | DB Srvr CPU (sec) | DB Srvr Disk (sec) |
|---|---|---|---|---|---|---|---|
| Login | 30 | 60 | 0.05 | 0.05 | 0.05 | 0.08 | 0.09 |
| Search | 30 | 60 | 0.06 | 0.06 | 0.06 | 0.08 | 0.07 |

Figure 8B:
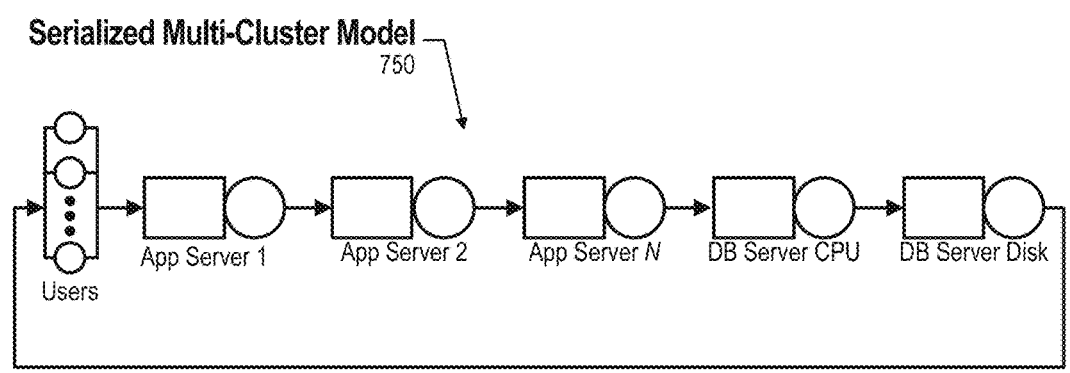
FIG. 8B is a depiction of a serialized multi-cluster model resulting from serializing the model shown in FIG. 8A.

FIG. 8B is a depiction of a serialized multi-cluster model resulting from serializing the model shown in FIG. 8A. Serialized multi-clustered model 750 shows the three app servers from the example serialized along with the database server CPU and database server disk. Unlike the parallel app servers shown in FIG. 8A, the app servers in FIG. 8B are modeled as serial servers. However, in order to serialize the system, new transaction groups are introduced—one for each extra node in the cluster. Each group contains the same set of transactions as what is in the original workload. So for the example, the search and login transactions in the original workload have additional transaction groups added. Here, there will be one login transaction and one search transaction for each app server (app server 0, 1, and 2). Login 0 and search 0 correspond to app server 0, login 1 and search 1 correspond to app server 1, and Login 2 and search 2 correspond to app server 2. Consequently, the number of users is divided between the transaction groups with a ratio equal to the probability associated with the corresponding cluster member which, in the example, is a 0.33 probability. For each unused transaction group, the service demand on the corresponding node (application server) is set to zero. For example, search1 will have service demand of 0.06 on AppServer1 and zero on AppServer0 and AppServer2 and so on. For the other resources in the network (Users, DB-Server CPU and DBServer Disk) the service demand will stay as it is in the entire transaction groups. This can be summarized as in the below table:

| Trans. | # users | Users (sec) | App Serv 0 (sec) | App Serv 1 (sec) | App Serv 2 (sec) | DB Srvr CPU (sec) | DB Srvr Disk (sec) |
|---|---|---|---|---|---|---|---|
| Login0 | 10 | 60 | 0.05 | 0.00 | 0.00 | 0.08 | 0.09 |
| Search0 | 10 | 60 | 0.06 | 0.00 | 0.00 | 0.08 | 0.07 |
| Login1 | 10 | 60 | 0.00 | 0.05 | 0.00 | 0.08 | 0.09 |
| Search1 | 10 | 60 | 0.00 | 0.06 | 0.00 | 0.08 | 0.07 |
| Login2 | 10 | 60 | 0.00 | 0.00 | 0.05 | 0.08 | 0.09 |
| Search2 | 10 | 60 | 0.00 | 0.00 | 0.06 | 0.08 | 0.07 |

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising one or more processors and a memory, the method comprising:
    identifying a complex Queuing Network Model (QNM) corresponding to a clustered system that handles a plurality of service demands using a plurality of parallel server nodes that process a workload for a quantity of users;
    receiving a workload description that includes server demand data corresponding to the workload;
    predicting a performance of the clustered system, wherein the predicting further comprises:
        transforming the complex QNM to a linear model by serializing the plurality of parallel server nodes as sequential server nodes;
        identifying a plurality of transaction groups, each transaction group corresponding to a different one of the sequential server nodes;
        distributing the workload among the plurality of sequential server nodes corresponding to the transaction groups; and
        analytically solving the linear model, wherein the solving comprises calculating a predicted resource utilization (RU) and a predicted response time (RT), and wherein the predicted performance of the clustered system includes the predicted RU and the predicted RT; and
    allocating system resources to the clustered system during execution, wherein the allocating comprises associating a portion of users to each of the plurality of parallel server nodes, the allocating based on the predicted performance of the clustered system.

2. The method of claim 1 further comprising:
    retrieving a cluster configuration that includes a quantity of application servers and a quantity of resource servers utilized by the application servers;
    for each transaction group, establishing one or more transaction group instances, each transaction group instance corresponding to one of the plurality of application servers;
    dividing the quantity of users among the application servers corresponding to the transaction group instances; and
    determining a service demand value for each transaction group instance on each of the plurality of application servers, wherein the service demand value is based on the service demand for the workload.

3. The method of claim 1 further comprising:
predicting software contention in the clustered system by:
identifying at least two QNMs for the clustered system; and
applying a two level iterative queuing model to each resource to identify a delay due to contention for a plurality of software resources at each of a plurality of system tiers in the at least two QNMs for the clustered system.

4. The method of claim 3 further comprising:
applying a product form approximation to the at least two QNMs to combine the plurality of software resources in a single QNM.

5. The method of claim 3 further comprising:
utilizing a set of measured results from a single user test to obtain service demands on hardware resources.

6. The method of claim 3 further comprising:
wherein the solving further comprises solving the at least two QNMs to identify the predicted RU and the predicted RT.

7. The method of claim 1 wherein the clustered system is a multi-tiered system, and wherein the method further comprises:
detecting an unbalanced workload; and
in response to the detection, associating a portion of users to each of the server nodes corresponding to the transaction groups to reflect the load distribution for each of the nodes.

8. An information handling system comprising:
one or more processors;
a memory coupled to at least one of the processors;
a set of instructions stored in the memory and executed by at least one of the processors, wherein the set of instructions perform actions of:
identifying a complex Queuing Network Model (QNM) corresponding to clustered system that handles a plurality of service demands using a plurality of parallel server nodes that process a workload for a quantity of users;
receiving a workload description that includes server demand data corresponding to the workload;
predicting a performance of the clustered system, wherein the predicting further comprises:
transforming the complex QNM to a linear model by serializing the plurality of parallel server nodes as sequential server nodes;
identifying a plurality of transaction groups, each transaction group corresponding to a different one of the sequential server nodes;
distributing the workload among the plurality of sequential server nodes corresponding to the transaction groups; and
analytically solving the linear model, wherein the solving comprises calculating a predicted resource utilization (RU) and a predicted response time (RT), and wherein the predicted performance of the clustered system includes the predicted RU and the predicted RT; and
allocating system resources to the clustered system during execution, wherein the allocating comprises associating a portion of users to each of the plurality of parallel server nodes, the allocating based on the predicted performance of the clustered system.

9. The information handling system of claim 8 wherein the actions further comprise:
retrieving a cluster configuration that includes a quantity of application servers and a quantity of resource servers utilized by the application servers;
for each transaction group, establishing one or more transaction group instances, each transaction group instance corresponding to one of the plurality of application servers;
dividing the quantity of users among the application servers corresponding to the transaction group instances; and
determining a service demand value for each transaction group instance on each of the plurality of application servers, wherein the service demand value is based on the service demand for the workload.

10. The information handling system of claim 8 wherein the actions further comprise:
predicting software contention in the clustered system by:
identifying at least two QNMs for the clustered system; and
applying a two level iterative queuing model to each resource to identify a delay due to contention for a plurality of software resources at each of a plurality of system tiers in the at least two QNMs for the clustered system.

11. The information handling system of claim 10 wherein the actions further comprise:
applying a product form approximation to the at least two QNMs to combine the plurality of software resources in a single QNM.

12. The information handling system of claim 10 wherein the actions further comprise:
utilizing a set of measured results from a single user test to obtain service demands on hardware resources.

13. The information handling system of claim 10 wherein the actions further comprise:
wherein the solving further comprises solving the at least two QNMs to identify the predicted RU and the predicted RT.

14. The information handling system of claim 8 wherein the clustered system is a multi-tiered system, and wherein the actions further comprise:
detecting an unbalanced workload; and
in response to the detection, associating a portion of users to each of the server nodes corresponding to the transaction groups to reflect the load distribution for each of the nodes.

15. A computer program product stored in a computer readable storage medium, comprising computer instructions that, when executed by an information handling system, causes the information handling system to perform actions comprising:
identifying a complex Queuing Network Model (QNM) corresponding to clustered system that handles a plurality of service demands using a plurality of parallel server nodes that process a workload for a quantity of users;
receiving a workload description that includes server demand data corresponding to the workload;
predicting a performance of the clustered system, wherein the predicting further comprises:
transforming the complex QNM to a linear model by serializing the plurality of parallel server nodes as sequential server nodes;
identifying a plurality of transaction groups, each transaction group corresponding to a different one of the sequential server nodes;

distributing the workload among the plurality of sequential server nodes corresponding to the transaction groups; and analytically solving the linear model, wherein the solving comprises calculating a predicted resource utilization (RU) and a predicted response time (RT), and wherein the predicted performance of the clustered system includes the predicted RU and the predicted RT; and allocating system resources to the clustered system during execution, wherein the allocating comprises associating a portion of users to each of the plurality of parallel server nodes, the allocating based on the predicted performance of the clustered system.

16. The computer program product of claim 15 wherein the actions further comprise:

retrieving a cluster configuration that includes a quantity of application servers and a quantity of resource servers utilized by the application servers;

for each transaction group, establishing one or more transaction group instances, each transaction group instance corresponding to one of the plurality of application servers;

dividing the quantity of users among the application servers corresponding to the transaction group instances; and determining a service demand value for each transaction group instance on each of the plurality of application servers, wherein the service demand value is based on the service demand for the workload.

17. The computer program product of claim 15 wherein the actions further comprise:

predicting software contention in the clustered system by:
identifying at least two QNMs for the clustered system; and applying a two level iterative queuing model to each resource to identify a delay due to contention for a plurality of software resources at each of a plurality of system tiers in the at least two QNMs for the clustered system.

18. The computer program product of claim 17 wherein the actions further comprise:

applying a product form approximation to the at least two QNMs to combine the plurality of software resources in a single QNM.

19. The computer program product of claim 17 wherein the actions further comprise:

utilizing a set of measured results from a single user test to obtain service demands on hardware resources; and wherein the solving further comprises solving the at least two QNMs to identify the predicted RU and the predicted RT.

20. The computer program product of claim 15 wherein the clustered system is a multi-tiered system, and wherein the actions further comprise:

detecting an unbalanced workload; and in response to the detection, associating a portion of users to each of the server nodes corresponding to the transaction groups to reflect the load distribution for each of the nodes.

\* \* \* \* \*